(12) United States Patent
Naylor

(10) Patent No.: X9700
(45) Date of Patent: Jun. 2, 1836

(54) SAW MILLS

(76) Inventor: Thomas B. Naylor

Thomas B. Naylor
Letters Patent

The Schedule referred to in these Letters Patent and making part of the same containing a description in the words of the said Thomas B. Naylor himself of his improvement in the Saw Mill

---

Be it known that I Thomas B. Naylor of Jonesville in the County of Surry and State of North Carolina have made a new and useful improvement in the Saw Mill which is described as follows reference being had to the annexed drawings of the same making part of this specification. The Saw Mill consists of a suitable frame A in which are constructed fender posts B. between which a gate C works up and down containing one or more saws D. to the bottom of this gate is attached a connecting rod or pitman E leading to the crank F on the horizontal shaft G at the bottom of the frame. on this shaft is a small pulley H around which passes a belt I leading to a large pulley K and around a small pulley on its shaft passes another belt L leading to another large pulley M To the end of the shaft of the last mentioned pulley the power is applied to operate the mill which may be water, steam, horse, or manual power A fly wheel N is added to equalize the motion of the machine. To the gate is attached a hand or arm O which by the alternate motion of the gate is made to act upon a rag wheel P. bringing forward the carriage containing the log to be sawed [illegible] upon the [illegible] of which rag wheel is a pinion Q working into a rack R. on the under side of the carriage S. A pall T drops into the notches of the rag wheel to prevent its returning. To this pall and to the hand are attached weighted cords U passing over a pulley V the weights resting upon a shelf W till thrown off by a trigger X acted upon by the side of one of the head blocks Y during the advance of the carriage causing the weight to descend and thus raising the hand pall from the notches of the rag wheel At the same moment the motion of the rag wheel is reversed by means of a grooved pulley Z on its shaft around which passes a weighted cord a leading over a pulley b at the top of the frame of sufficient strength to run the carriage back which is effected the moment the carriage reaches the end of the frame and when the head block comes in contact with the trigger as before described. The log is secured to the head blocks by iron stops. What I claim as my invention and which I desire to secure by Letters Patent consists in the before described machine for sawing timber.

Thomas B. Taylor

Witness
Wm P. Elliot
Benjamin W. Taylor 495 words

Drawings